(12) United States Patent
Liet

(10) Patent No.: US 10,609,870 B2
(45) Date of Patent: Apr. 7, 2020

(54) MATERIAL HANDLING DEVICE FOR SEPARATING FEED FOR LIVESTOCK

(71) Applicant: Cornelis Hendricus Liet, Losser (NL)

(72) Inventor: Cornelis Hendricus Liet, Losser (NL)

(73) Assignee: Cornelis Hendricus Liet, Losser (NL)

( * ) Notice: Subject to any disclaimer, the term of this patent is extended or adjusted under 35 U.S.C. 154(b) by 885 days.

(21) Appl. No.: 15/043,960

(22) Filed: Feb. 15, 2016

(65) Prior Publication Data

US 2016/0242361 A1 Aug. 25, 2016

(30) Foreign Application Priority Data

Feb. 13, 2015 (NL) .................................... 2014296

(51) Int. Cl.
| | | |
|---|---|---|
| B66C 3/02 | (2006.01) | |
| B66C 17/06 | (2006.01) | |
| B66C 3/12 | (2006.01) | |
| B66C 3/16 | (2006.01) | |
| B66C 3/18 | (2006.01) | |
| B65G 47/90 | (2006.01) | |

(Continued)

(52) U.S. Cl.
CPC .......... *A01F 29/08* (2013.01); *A01F 25/2027* (2013.01); *B65G 47/901* (2013.01); *B65G 47/905* (2013.01); *B66C 3/02* (2013.01); *B66C 3/125* (2013.01); *B66C 3/16* (2013.01); *B66C 3/18* (2013.01); *B66C 17/06* (2013.01)

(58) Field of Classification Search
CPC ... A01F 25/2027; A01F 29/08; B65G 47/901; B65G 47/905; B66C 3/02; B66C 3/125; B66C 3/16; B66C 3/18; B66C 17/06
See application file for complete search history.

(56) References Cited

U.S. PATENT DOCUMENTS 3,494,485 A 2/1970 Hasegawa
3,580,392 A * 5/1971 Starbuck .............. B65G 47/901
198/468.2

(Continued)

FOREIGN PATENT DOCUMENTS

EP 0677477 A1 10/1995
EP 1516848 A1 3/2005
(Continued)

OTHER PUBLICATIONS

International Search Report for Dutch patent application No. NL2014296, dated Oct. 15, 2015, 6 pages.

(Continued)

*Primary Examiner* — Saul Rodriguez
*Assistant Examiner* — Ashley K Ramano
(74) *Attorney, Agent, or Firm* — Steven M. Koehler; Westman, Champlin & Koehler, P.A.

(57) ABSTRACT

A material handling device for the loosening of forage, in particular silage from a silo. The material handling device is provided with a grab device provided with grab device members of which the edges facing towards each other are provided with cutting elements. The grab device members are movable between a closed position and an opened position, wherein the cutting elements are positioned at an angle with the vertical. This angle is in the range of −25 to 25 degrees, preferably −15 to 15 degrees with the vertical.

19 Claims, 10 Drawing Sheets

(51) Int. Cl.
*A01F 29/08* (2006.01)
*A01F 25/20* (2006.01)

(56) References Cited

U.S. PATENT DOCUMENTS

| | | | | |
|---|---|---|---|---|
| 3,878,614 | A * | 4/1975 | Bruneau | B43L 13/045 |
| | | | | 33/438 |
| 3,896,952 | A | 7/1975 | Yokota | |
| 3,937,162 | A * | 2/1976 | Fukutani | B63B 57/00 |
| | | | | 114/382 |
| 4,012,856 | A * | 3/1977 | Schwarz | B66C 3/00 |
| | | | | 294/68.23 |
| 5,222,439 | A * | 6/1993 | Di Rosa | B61C 13/04 |
| | | | | 104/93 |
| 6,134,815 | A * | 10/2000 | Rohr | B66C 3/16 |
| | | | | 37/187 |
| 9,061,738 | B2 * | 6/2015 | Eriksson | B63B 21/04 |
| 2005/0063812 | A1 | 3/2005 | Bos | |
| 2010/0326363 | A1 * | 12/2010 | Van Den Berg | A01K 1/105 |
| | | | | 119/57.92 |
| 2012/0047668 | A1 * | 3/2012 | David | B08B 9/08 |
| | | | | 15/93.1 |
| 2015/0104273 | A1 * | 4/2015 | Van Kuilenburg | A01K 5/0266 |
| | | | | 414/21 |
| 2016/0023867 | A1 * | 1/2016 | Posthumus | B01F 15/00662 |
| | | | | 366/150.1 |
| 2016/0219831 | A1 * | 8/2016 | Van Den Berg | A01K 5/004 |

FOREIGN PATENT DOCUMENTS

| | | |
|---|---|---|
| EP | 2232982 A | 9/2010 |
| WO | 9964341 A1 | 12/1999 |
| WO | 2013157931 A1 | 10/2013 |

OTHER PUBLICATIONS

Written Opinion for Dutch patent application No. NL2014296, dated Oct. 15, 2015, 8 pages.

* cited by examiner

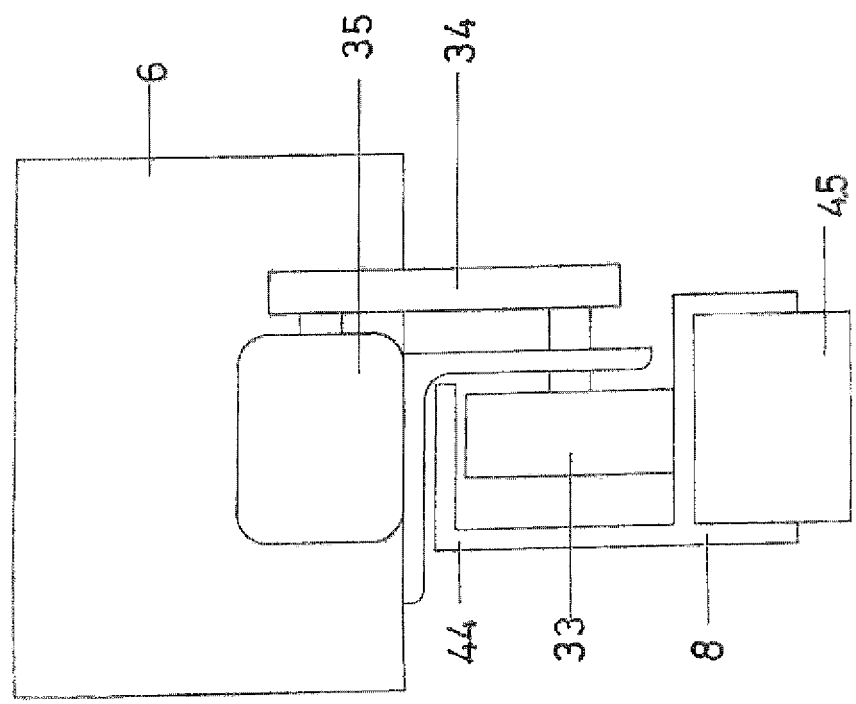

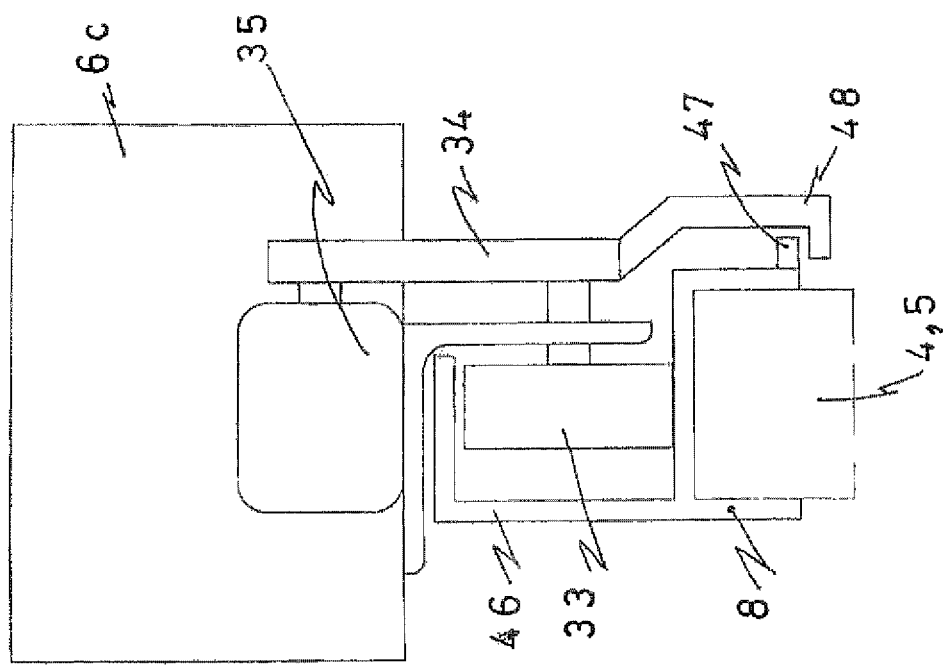

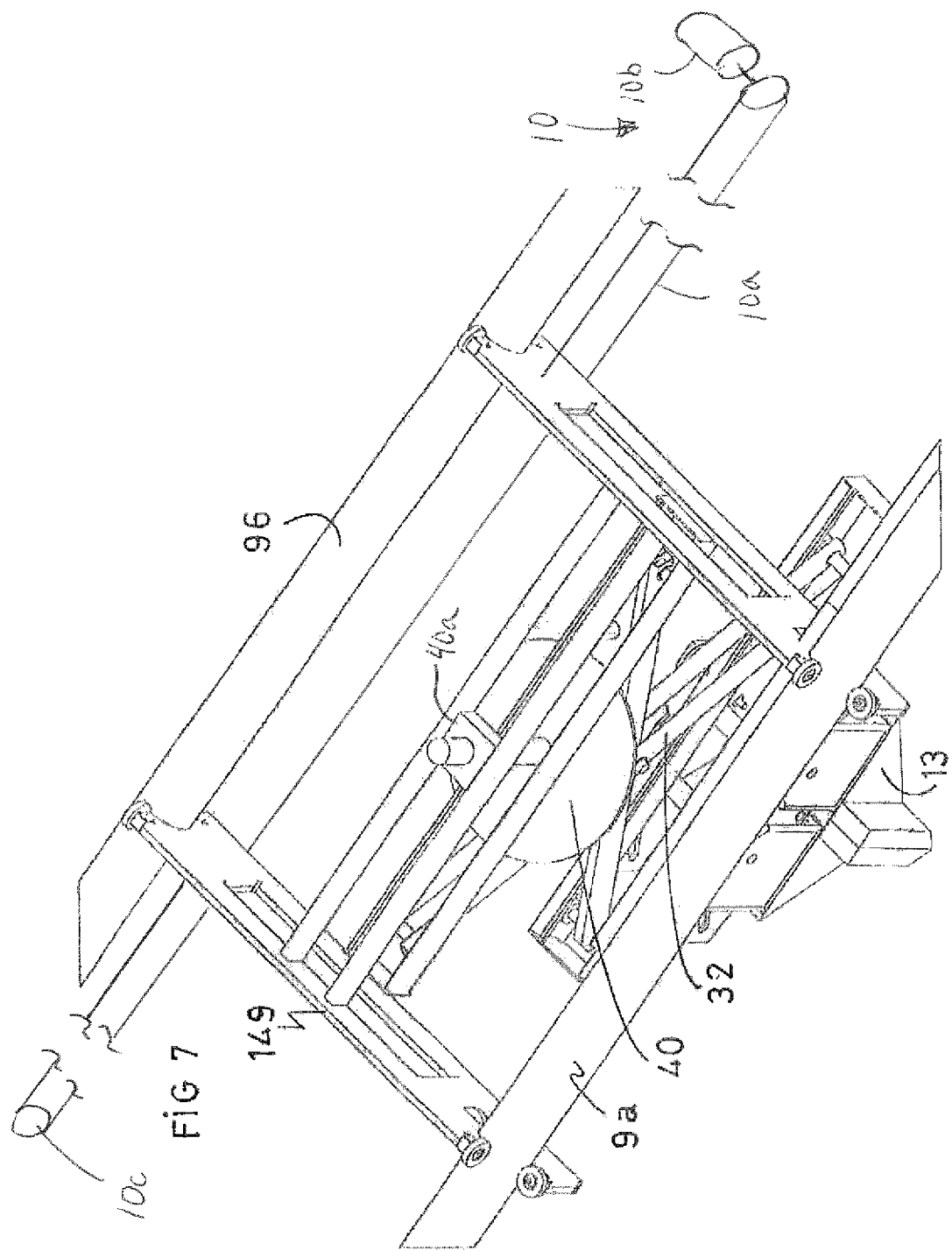

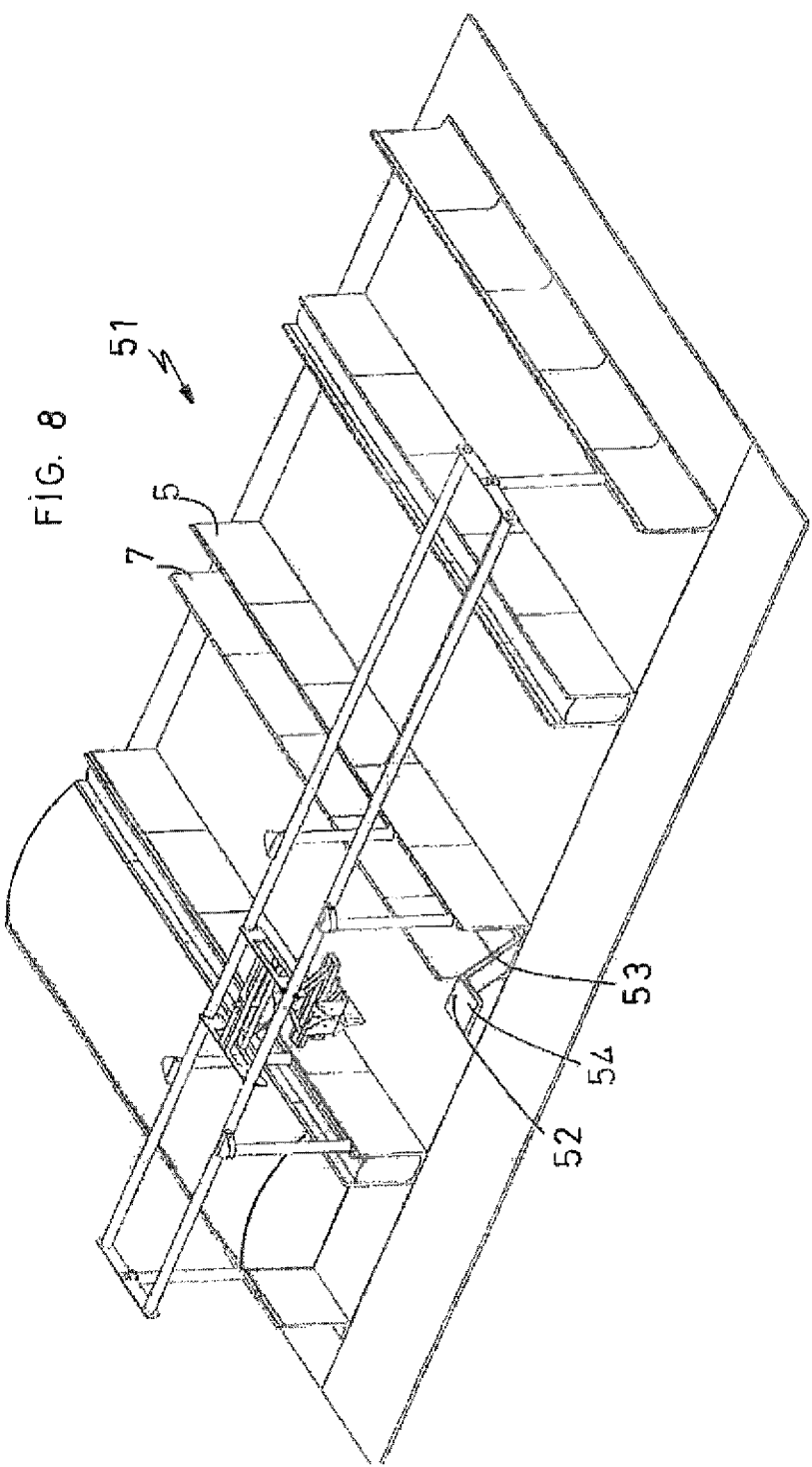

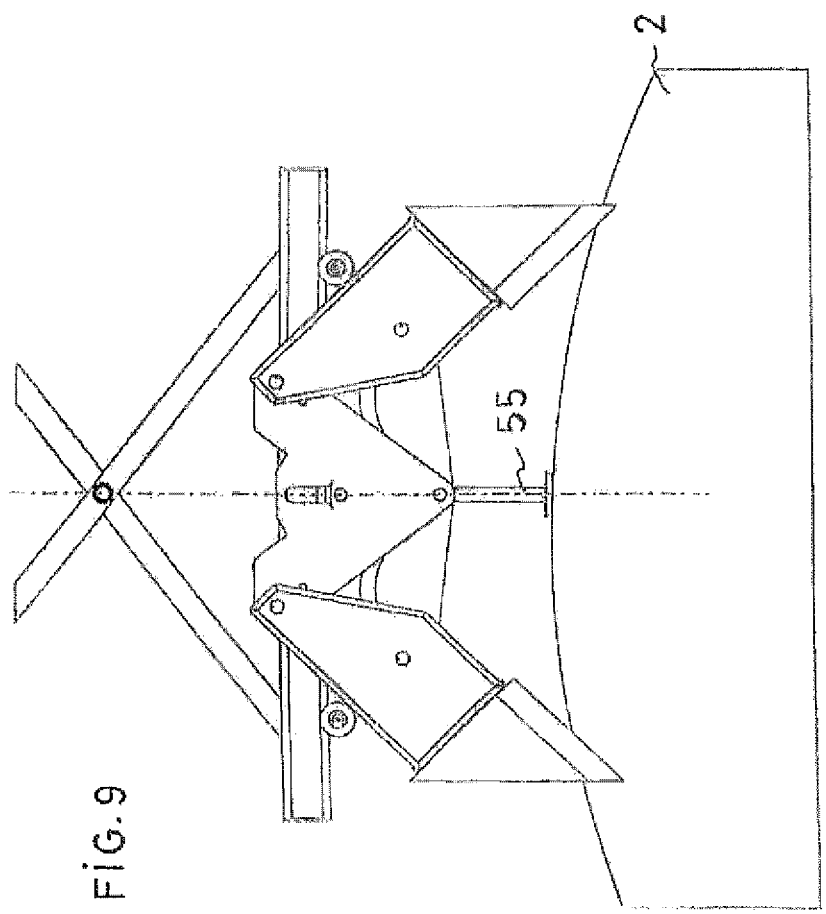

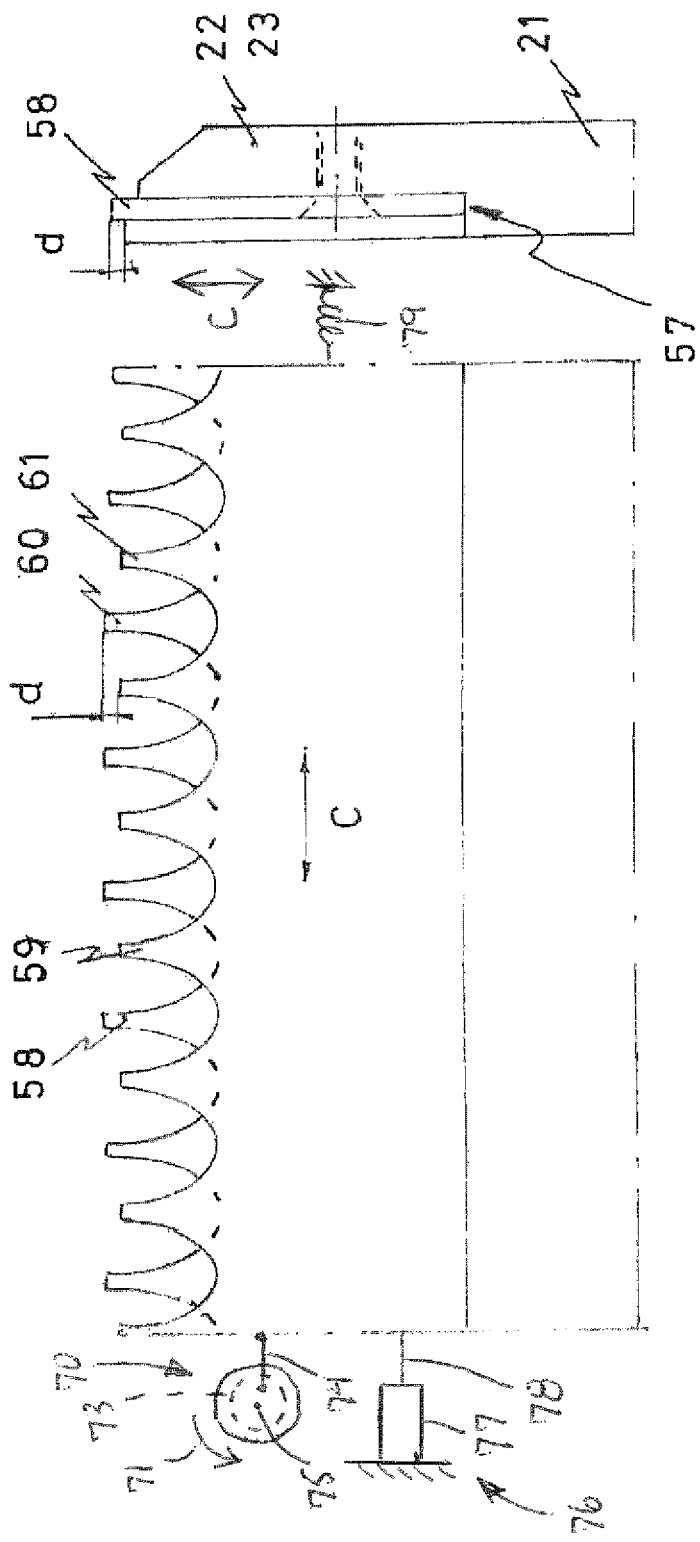

MATERIAL HANDLING DEVICE FOR SEPARATING FEED FOR LIVESTOCK

BACKGROUND

The discussion below is merely provided for general background information and is not intended to be used as an aid in determining the scope of the claimed subject matter.

Aspects of the invention relate to a material handling device for separating feed for livestock, in particular compacted forage such as silage in a silo, or bales.

Silage is collected layer by layer into a silo and compacted, for example by riding over it with a tractor. By compacting, the feed is protected against environmental factors, such as oxygen, and storage becomes possible for a longer period of time. The silage is typically dissected into blocks which can then be used in a supply bunker or feed kitchen. Also, the feed can be separated at the spot, such as, for example, is known from EP 2 232 982 A. However, this is labor intensive and non-computerized labor wherein usually more is loosened than necessary. An excess of loosened forage spoils quickly and cannot be stored for a long period of time.

SUMMARY

This Summary and the Abstract herein are provided to introduce a selection of concepts in a simplified form that are further described below in the Detailed Description.

This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

A device with which compacted forage can be detached and dosed in a simple, efficient, and preferably automated manner, includes a grab device having opposed members having edges that face towards each other and are provided with cutting elements. The opposed members can be moved between a closed position and an opened position, wherein the cutting elements are arranged at an angle with the vertical, which angle lies in the range of −25 to 25 degrees, preferably −15 to 15 degrees with the vertical.

At this point it should be noted that aspects of the invention can be used on various grab devices such as but not limited to grapples, clam buckets (clamshell buckets) and the like. The opposed members for instance can comprise blocks, plates, tines, etc. on grapples, or buckets on a clam or clamshell bucket assembly.

With such a device, it is possible to detach silage quickly and efficiently from above. In the opened position of the grab device, the cutting elements are at an advantageous angle of intersection with the upper surface of the silage. As a result, the silage can for instance directly be cut loose from the silo, and be dosed without having to be cut loose in blocks first. Because this intermediate step can be beaten, time and costs can be saved. The grab device is capable of penetrating to a desired depth of cut in the silage, after which the grab device may be closed. This enables the removal of an accurately metered amount of feed.

The grab device may, for example, be movable in a first horizontal direction, along one or more beams which are moveable along a guideway in a second horizontal direction. As a result, the full range of a silo or feed kitchen can be covered. The guideway may thereby be provided with flanges for the provision of a vertical reaction force on the beams when the cutting elements of the grab device are pressed into the silage. As a result, a considerably larger cutting force may be exerted.

The beams may for example be supported by columns, wherein the girders and the columns are moveable as a whole along said guideway.

The apparatus may be provided with, for example, at least two parallel walls, each of which is provided with a guiding rail on which one or more of the columns rest and along which the respective columns are movable. For example, the guiding rail may be arranged on the upper edge of the associated wall. The silage may be collected between the walls and be compacted there.

In an exemplary embodiment, one of the guiding rails may cooperate without play with rollers that support columns on the respective guiding rail. The guiding rail may for example be an I-profile, in which the columns are supported by a first roller with a horizontal axis that runs over an upper surface of the I-section, and two lateral, vertical rollers that run on both sides of the I-profile over the side faces of the profile. In order to prevent jamming of the beams, the other guiding rails may comprise a profile that incorporates rollers with clearance in horizontal and vertical direction. Such a profile may for example consist of a C-profile in which at least one roller that is attached to the respective column is rollably accommodated with play. The upper flange of the C-profile herein prevents the roller can be moved up too much, in particular, during the cutting, whereby an upward force is exerted on the grab device and the beams.

For collecting the amount of forage loosened by the grab device, the device may be provided with one of more collector bins. The collector bin may for example be suspended to one or more columns on one of the walls and be movable along with the columns. Because the collector bin moves along with the columns, the grab device needs to be moved, after taking a bite, only via the beams, while the columns will remain at their places. The displacement of the columns over the wall parts will in practice be more gradual than the displacement of the grab device via the beams. For limiting the displacement of the grab device via the beams, the collector bin is preferably positioned as central as possible.

The collector bin may for example be suspended on an outer side of the device or in an empty interspace between two parallel partitioning walls of the device.

If the device is used for a silo with several silo slots, the device may comprise three or more of said parallel walls. These walls then comprise two outer walls and one or more inner walls, by which the longitudinal sides of all silo slots are bordered. Next to each inner wall a parallel auxiliary wall may be positioned. Between the respective inner wall and the auxiliary wall that is positioned next to it an interspace is present, in which for example a collector bin may be accommodated that is movable along with the columns. Preferably, the collecting tray can be moved vertically, for example along the columns standing on the respective wall, between a lower receiving position and an upper position in which it is possible to empty the bin. In order to be able to empty the bin, the bottom of the collector bin may be arranged as a conveyor belt that may is capable of discharging the forage via a discharge opening in a wall of the collector bin, for example to a loading platform of a trolley or a feeding robot.

The collector bin may for example be provided with one or more mixing means, such as a rotatably drivable mixing auger. The drive of the mixing unit may thereby be controlled by a control unit that activates the mixing member as soon as the amount of collected forage exceeds a minimum value. The grab device may include one or more sensors for determining the amount of forage cut-loose. These sensors may, for example, be weight sensors or volume sensors, such as sensors for the measurement of the cutting depth, after which the separated volume may be calculated on the basis of the preknown distance between the cutting edges in the opened position of the grab device and the length of the cutting edges. When the grab device cuts loose a part of the forage, the cutting depth and the cutting width may be determined by a computer, and the separated volume may be calculated, assuming a fixed cutting length (=the distance between the cutting edges when the grab device is fully opened). Preferably, this does not happen at a first bite of the grab device, because the upper face of the silage is then still irregular and may contain pits and holes. In a second or further bite, the removed strip has a more or less uniform thickness so that the volume may be easily determined. When both the volume and the weight have been determined, the specific gravity of the computer may be calculated. Then, the computer can always easily calculate the desired cutting depth and cutting width of a next bite that are needed in order to achieve a certain final weight.

If the grab device is driven by electric motors, it becomes possible to measure the horizontal and the vertical movements of the grab device accurately by the number of revolutions of the rotors of the electric motors, with the aid of a suitable sensor or tachometer. In this manner, it becomes possible to determine, for example, the cutting depth and the cutting width (the width of the bite that is to be taken off in the direction along the cutting edges) accurately.

In a specific embodiment, each inner wall may carry a front column and a rear column, wherein the front columns support a front beam and the rear columns support a rear beam, and wherein the grab device includes a frame, that is movable along the front and rear beam. The two columns supported by one and the same wall may thereby be connected at the bottom side by means of a coupling beam to which an auxiliary motor is provided that drives the movement of the columns along the guideway by means of a transmission.

The cutting edges of the grab device members may, for example, consist of straight knives, serrated knives, cutting edges and/or point-shaped blades engaging in one another. The cutting edges may, for example, further be provided with a drive for moving back and forth the cutting elements in connection with the closing of the grab device. The reciprocating cutting elements may be, for example, saw segments. The back and forth movable cutting elements will typically be moved in a direction parallel to the longitudinal direction of the cutting edge. For example, a row of movable cutting teeth may be moved back and forth with respect to a row of fixed cutting teeth, wherein both rows of cutting teeth overlap each other. In a particular embodiment, the cutting elements comprise a fixed knife with a row of cutting teeth, and a knife that is movable back and forth and has a row of cutting teeth, wherein the two rows of cutting teeth overlap each other, and wherein the cutting teeth of the fixed knife protrude with respect to the cutting teeth of the moving knife. At the closing of the grab device the long teeth of the fixed knife will push aside any stones or other hard objects possibly present, as a result of which the moving cutting teeth of the moving knife are shielded and the risk of damage is reduced.

The grab device members may be arranged with edges that are vertical and connecting to each other, in the closed position. These edges may also be provided with cutting edges, such as knives, serrated edges, or saw segments that may optionally be driven for a reciprocating cutting or sawing movement.

In order to obtain a substantially straight cutting plane, the grab device may be made so that the grab device members can be moved upwards through a slotted guideway during the closing of the grab device. The cutting edges of the grab device may thereby be moved in a substantially straight horizontal line towards each other during the closing. This allows flat slices of forage to be cut loose, whose volume can be properly determined by presetting the cutting depth and cutting width.

The grab device may further comprise a frame with a horizontal sliding or roller guideway along which the grab device members are freely moveable. As a result, the grab device is self-locating in situations where the upper surface of the stock of silage is not flat: if one of the grab device members in the opened position of the grab device experiences a cutting resistance earlier than the other grab device member does, the grab device member will move sideward until the second grab device member also experiences cutting resistance. After this, the grab device may be closed further.

The frame of the grab device may comprise an upper sub frame, that is movable forth and back via the beams, and a lower sub frame, that may be moved up and down relative to the upper sub frame, for example by means of a scissor construction.

If desired, the grab device may be rotatable about a vertical axis, for example, over an angular range of 180 degrees.

If the grab device is moveable downwards at an angle of at least 75 degrees with the floor, the grab device is also suitable for detaching silage from bales or blocks.

The device may further also be provided with a control unit arranged to at least partially close the grab device and to re-open it one or more times during grabbing, for example after reaching a maximum cutting pressure. As a result, the silage at the location of the cutting line is loosened so that the knives are allowed to cut the silage more easily and with less back pressure.

The device may for example be used at a silo, for example a silo having one or more silo slots positioned next to each other. However, the device is also suitable for use in a covered feed kitchen where the silage has been put down in pre-cut blocks.

BRIEF DESCRIPTION OF THE DRAWINGS

Aspects of the invention will be explained in more detail with reference to the drawings.

FIG. 5: shows the guideway over a second or further wall;

FIG. 6 shows an alternative guideway;

FIG. 7: shows a perspective top view of the grab device;

FIG. 8: shows an alternative embodiment of a device;

FIG. 9: shows another possible embodiment of the grab device;

FIG. 10: shows a front view of a cutting edge of the grab device;

FIG. 11: shows a side view of the cutting edge of FIG. 10.

DETAILED DESCRIPTION OF ILLUSTRATIVE EMBODIMENTS

Figure 1:
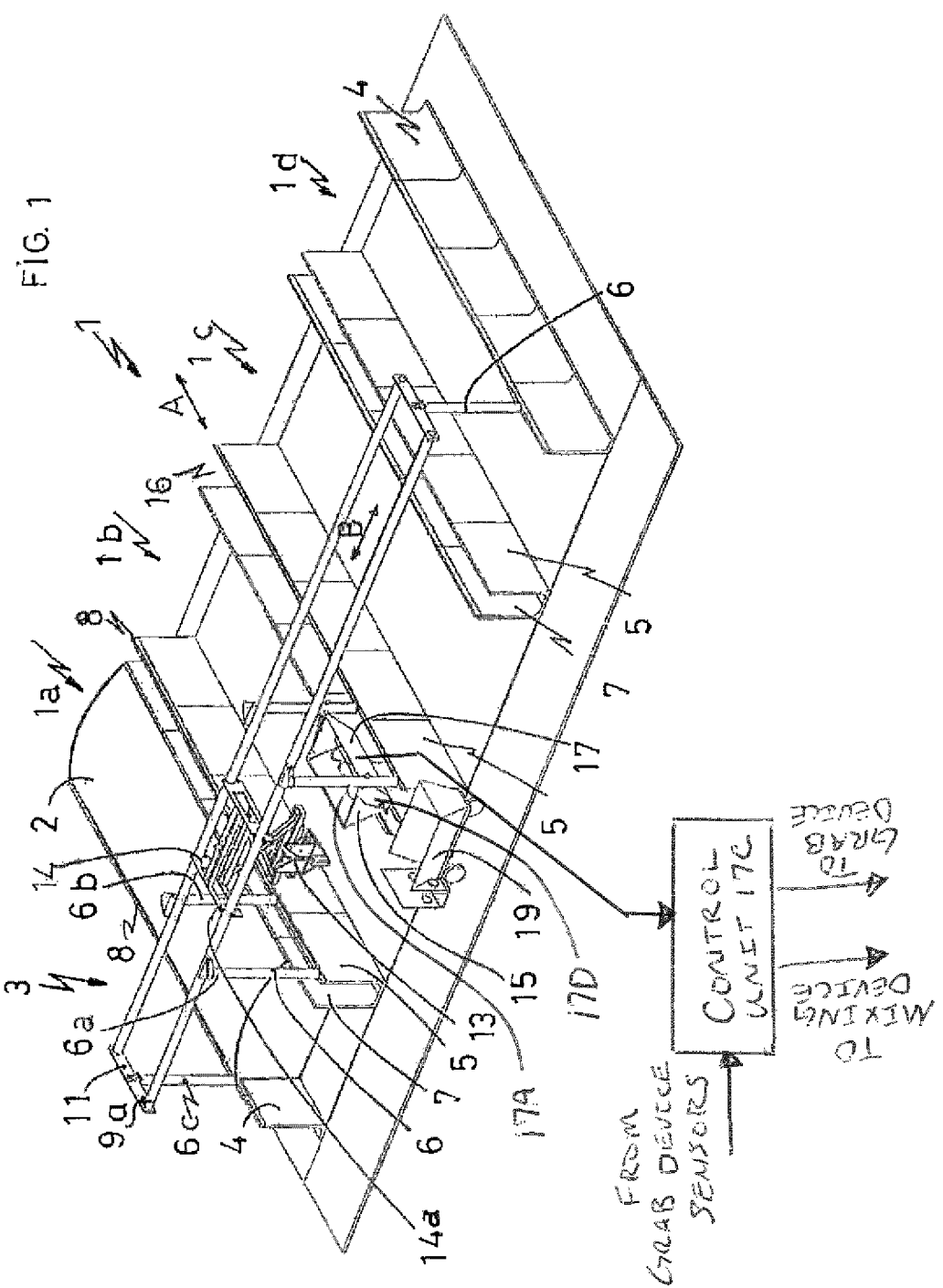
FIG. 1: shows, in perspective, a preferred embodiment of a device.

FIG. 1 shows a silo 1 with four silo slots 1a, 1b, 1c, 1d of which one is filled with silage 2 in the drawing. In the exemplary embodiment of FIG. 1, the silo 1 is provided with a device 3 with a number of parallel walls bordering the silo slots 1a, 1b, 1c, 1d: two outer walls 4, three load-bearing inner walls 5 that allow columns 6 to rest upon them, and three non-load-bearing auxiliary walls 7 each positioned next to an inner wall 5.

The load-bearing inner walls 5 and the outer walls 4 are provided at the upper side with a guideway 8 along which the columns 6 are movable back and forth in a first horizontal direction A that coincides with the longitudinal direction of the respective wall 5. Each load-bearing wall 5 carries a front column 6a and a rear column 6b. The front columns 6a jointly carry a front beam 9a. The rear columns 6b jointly carry a rear beam 9b. At both ends, the two parallel beams 9a, 9b, are coupled by means of a coupling beam 11, which is centrally supported by a single column 6c which in turn is supported by the guideway 8 at the upper side of the respective outer wall 4.

The device 3 further comprises a grab device 13 having a frame 14 suspended from the beams 9a, 9b, and that is movable along these beams 9a, 9b in a second horizontal direction B, which is substantially perpendicular to the first horizontal movement direction A of the columns 6. Various mechanisms can be used to move the grab device 13 along beams 9a, 9b. FIG. 7 schematically illustrates a drive 10 having a flexible member 10a (e.g. belt, chain, cable) coupled to grab device 13 driven by a motor 10b at a first end and a pulley 10c or the like at a second end. In an alternative embodiment not shown, a drive comprising a motor mounted on grab device 13 having a pinion gear engaging a linear rack mounted to beam 9b can be used. The grab device 13 thus may be moved in the direction A as well as in the direction B and may thus be moved over the entire range of the silo 1.

Between each carrying inner wall 5 and the auxiliary wall 7 positioned next to it, an intermediate space 16 is present. In one of the intermediate spaces 16, a collector bin 17 is positioned in which the forage that has been loosened by the grab device 13 may be collected. The collecting bin 17 is vertically movable between a low position, in which it is located in the intermediate space 16 between the two walls 5, 7, and an upper position, as shown in FIG. 1. In this upper position, it is possible to empty the tray 17 in a conveyor trolley 19. The collector bin 17 may be provided to this end with a bottom consisting of a conveyor belt 15 which discharges the forage into the collector bin 17 via an opening in the wall of the collector bin 17 into the conveyor trolley 19. After the collector bin 17 is emptied, it is moved downwardly again in the intermediate space 16, so that it becomes possible again to place the grab device 13 above the collector tray 17 in order to load new amounts of feed into the collector bin 17.

Figure 2:
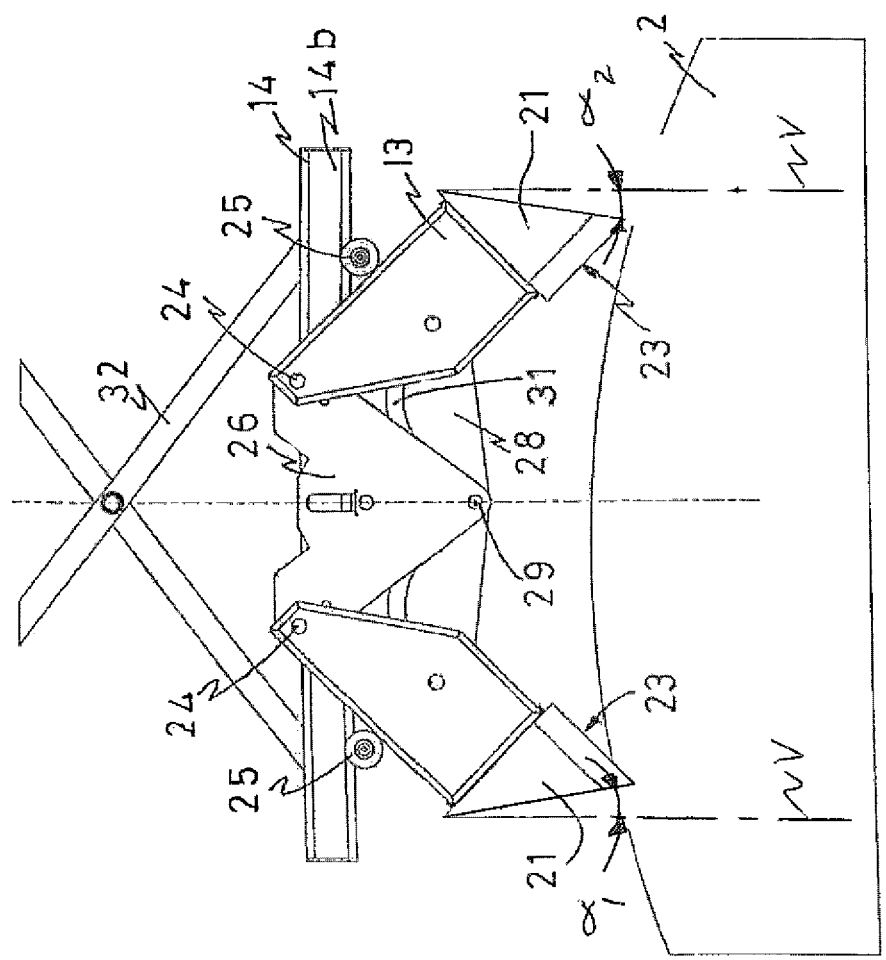
FIG. 2: shows a grab device of the apparatus of FIG. 1 in opened position.
Figure 3:
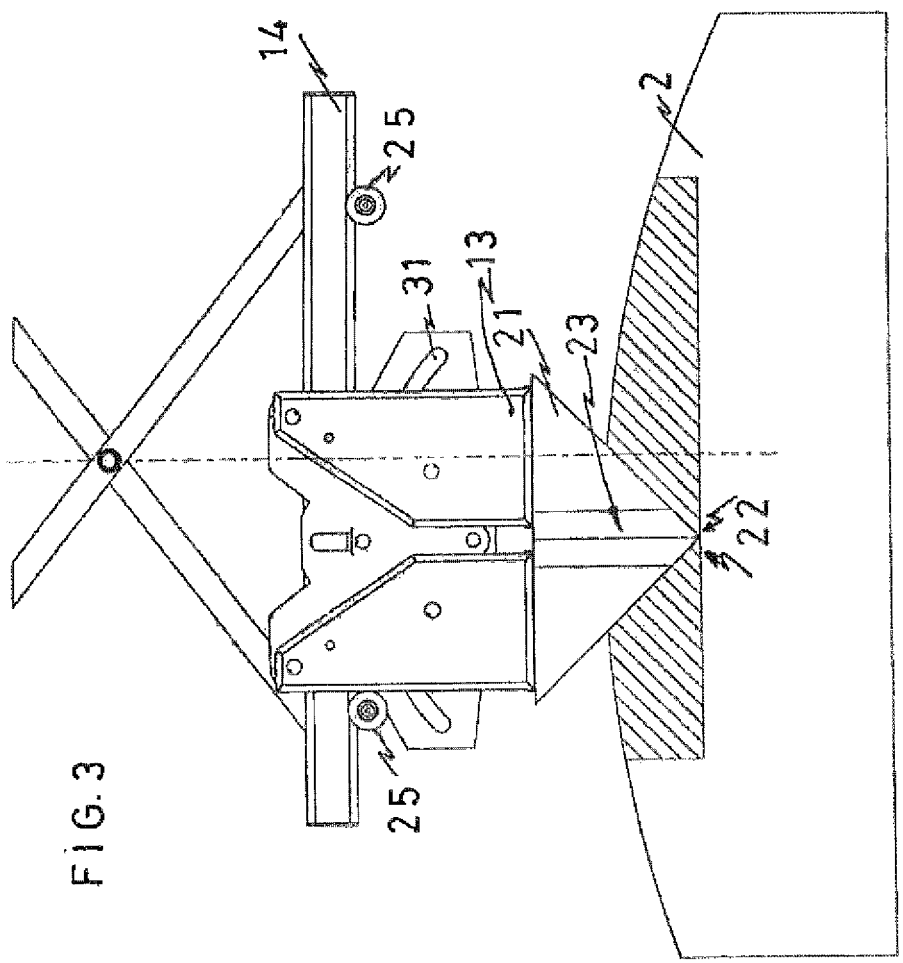
FIG. 3: shows the grab device of FIG. 2 in closed position.

FIG. 2 shows the grab device 13 in the opened position. The grab device 13 comprises two identical, symmetrically arranged grab device members (e.g. blocks, plates, tines, and/or buckets) 21 with cutting edges 22 that point downward in the opened position and that abut closingly against each other in the closed position (FIG. 3). In the opened position, the cutting edges may be at an angle α1, resp. α2 with the vertical of, for example, −15 to 15 degrees.

In the closed position (FIG. 3), the grab device members 21 also have vertical, mutually adjoining edges 23, that are also provided with cutting edges. The grab device members 21 are each suspended in a hinging manner by means of a hinge 24, to a suspension plate 26 that is carried by a guiding plate 28 of the frame 14. The suspension plate 26 may move up and down over a short distance with respect to a guiding plate 28 via a vertical slotted guideway 29. Both grab device members 21 are guided via a curved slide guideway 31, in such a manner that the cutting edges 22 perform a substantially straight, horizontal movement during the closing and the opening of the grab device 13, such that it becomes possible to cut loose a substantially straight slice of silage. If embodied as buckets members 21 can each have a cavity to receive the cut silage.

The drive 13 of the grab device (not shown) may comprise, for example electric motors, hydraulic cylinders, or similar drives that are common for grab devices. If the drive consists of electric motors, it may be provided with a tachometer so that the cutting depth can be tracked accurately. Optionally, the grab device may also be provided with one or more distance sensors or 3D cameras for tracking the cutting depth, outputs of which are provided to a control unit 17C. Another alternative is shown in FIG. 9, in which a grab device is shown which is provided with a spacer 55 that may be set at the desired length. As soon as this touches the silage 2, the desired cutting depth has been reached. The control unit 17C can include a computer for the calculation of the volume of forage that has been separated by the grab device 13. 16. The computer can be configured to determine, after the grab device 13 has released a bite of silage the specific gravity of the silage on the basis of the weight measured by the weighing sensors and the calculated volume of the bite of silage and for the determination of the desired volume and/or weight of a next bite of silage to be taken by the grab device 13. If desired, the control unit 17C is set up to determine the specific gravity only of a second or further bite of silage by the grab device 13.

The frame 14 includes an upper sub frame 14a that is movable along the girders 9a, 9b and a lower sub frame 14b that is suspended to the upper sub frame 14a by means of a scissoring frame 32. Through folding in and out of the scissoring frame 32, the lower sub frame is movable up and down along with the grab device 13. An actuator 32a schematically illustrates a drive for raising and lowering the sub frame in FIG. 2. The scissoring frame 32 may be rotatably attached to the upper part frame 4a by means of a vertical axis of rotation 40 via a drive 40a so that the grab device 13 is rotatable around its vertical axis, for example, over an angular range of 180 degrees, as shown in FIG. 7.

The lower sub frame 4b includes two horizontal rails 30, to which the hanger plate 26 is suspended by means of rollers (not shown). This enables the grab device 13 to be moved freely back and forth along the rails 30 between two stops 25. The two stops 25 are located at the same distance from the center line of the grab device 13. When the grab device 13 is in opened position, the grab device 13 simultaneously abuts to both stops 25. As a result thereof, the grab device 13 is always suspended on the frame 4 in a centered manner.

If the top layer of the silage is not flat, the one grab device member 21 will come into contact with silage earlier than the other grab device member 21 than when the grab device 13 is closed. As a result, the grab device 13 will move aside during the closing further until the second grab device member also meets the silage. This causes both grab device members to be loaded simultaneously and evenly, as a result of which the generation of pry and bending moments is reduced. When the grab device 13 opens again above the collector bin, the grab device 13 is re-centered again by means of the stops 25, so that no forage falls outside the collector bin.

The collector bin 17 can be provided with one or more mixing units or devices, such as a rotatably drivable mixing auger 17A. In addition, collector bin 17 can include one or more sensors (cameras, weight sensor and/or volume sensor) for determining the amount of forage collected in the collector bin 17. Output(s) 17B from the sensor(s) are provided to control unit 17C. The control unit 17C activates a drive 17D for the mixing device 17A as soon as the amount of collected forage exceeds a minimum value.

Figure 4:
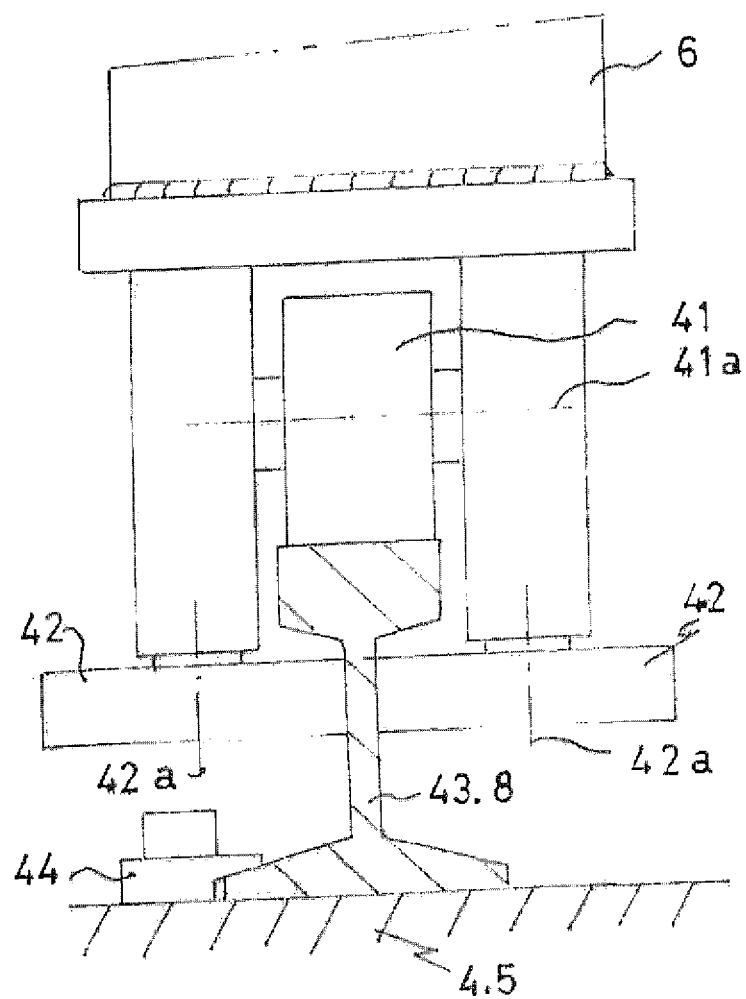
FIG. 4: shows the guideway of a column in relation to a silo wall of the device of FIG. 1.

FIG. 4 shows in cross-section a column support on one of the walls 4 or 5. Here, the guiding rail 8 comprises an I-profile 43 that is fastened at an upper edge of the wall 4, 5 by means of clamps 37, and extends in the displacement direction A. A first roller 41 with a horizontal axis 41a rests on an upper surface of the I-profile 43. On both sides of the I-profile 43 two rollers 42 with vertical axes 42a are provided. The three rollers 41, 42 are placed around the I-profile free of play or with little play, in such a manner that the column 6 is movable on the I-profile 43 only by allowing the simultaneous rolling of all three of the rollers 41, 42.

In order to prevent jamming, the other walls 4, 5 are provided with a different guideway. This guideway is shown in FIG. 5. The guiding rail 8 comprises a C-profile 44 with two downwardly diverging flanges between which the upper edge of the wall 4, 5 is clamped. Other attachments may also be applied. In the cavity surrounded by the C-profile, a roller 33 is accommodated that is connected to the column 6 with play and that is drivable by an auxiliary motor 35 via a transmission 34 to move in direction A.

When the grab device 13 is pressed into a stock of silage, a reaction force will press the grab device 13 with the beams 9a, 9b and the columns 6 upward. However, the C-profile 44 prevents that the roller 33 can be moved upwards and as a result provides a counterforce via the column and the beams 9a, 9b and the column 6 with the beams and the grab device 13. As a result, it becomes possible to press the grab device 13 into the silage with a larger force.

FIG. 6 shows an alternative for the guideway of FIG. 5. Here, the roller 33 runs in an L-profile 46 instead of a C-profile. The desired reaction force which has to prevent that the column 6 during grabbing of the wall 4, 5 is lifted off, is generated here by means of a ledge 47 on the underside of the L-profile 46 and a flange 48 disposed below 48 this which is connected to the impeller 33.

FIG. 8 shows an alternative embodiment of a device according to the invention. This device 51 does not include a collector bin, but, instead thereof, a conveyor belt 52 which forms the bottom of the space between one of the walls 5 and the auxiliary wall 7 placed next thereto. At the front side of the device 51 the conveyor belt 52 runs obliquely upwards over a portion 53 to terminate in a raised horizontal end 54. A collecting car may be driven under the horizontal part 54, after which the conveyor belt may be activated to load forage that has been collected on the conveyor belt 52, into the collecting car.

FIGS. 10 and 11 show an example of cutting elements that are suited for application at the grab device 13 at the cutting edges 22, 23. The cutting elements 56 are mounted in recesses 57 at the ends of the edges 22, 23 of the grab device members 21 and comprise a static bottom knife 58 and a movable upper knife 59. Both knifes 58, 59 are provided with cutting teeth 60, 61, wherein the cutting teeth 60 of the lower blade 58 protrude by a distance d above the cutting teeth 61 of the moving knife 59. When the grab device 13 closes, the longer teeth of the static knife will push away stones or other hard elements that are possibly present. Thus the moving knives 59 obtain an additional protection, so that the risk of damaging the moving blades by stones in the silage material is reduced significantly.

Exemplary devices for moving the knives 59 (i.e. the plate they are formed on) can include a rotary drive 70 rotated in direction 71 by a suitable motor 73 (e.g. electric, pneumatic or hydraulic). Moving knives 59 are coupled to drive 71 with a link 74 that is offset from an axis of rotation 75. In another embodiment, drive 76 includes a linear actuator 77 (e.g. electric, pneumatic or hydraulic) that is coupled to moving knives 59 with a link 78 that oscillates linearly in the direction C with moving knives 59. A spring 79 schematically illustrated can be incorporated in or directly coupled to actuator 77 to function with the actuator 77 to provide a restoring force, if desired. FIG. 11 also schematically illustrates the angle of the cutting edges where arrow 83 (85) is the vertical direction.

The moving knife 59 may be moved forth and back during the closing of the grab device 13 in a direction that is parallel to the cutting edge, in the direction C in the figure.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

The invention claimed is:

1. A material handling device for separating feed for livestock, comprising:
   at least one support beam;
   a grab device supported by and configured to move along the at least one support beam in a first horizontal direction, the grab device having grab device members configured to move between a closed position and an opened position, wherein the grab device members have cutting edges provided with cutting elements, the cutting edges facing towards each other when the grab device members are in the closed position;
   a guideway arranged in a second horizontal direction; and
   columns coupled to the guideway and supporting the at least one support beam and grab device in an elevated position, the columns, the at least one support beam and grab device being movable as a unit along the guideway in the second horizontal direction.

2. The material handling device according to claim 1, wherein the at least one support beam and the columns as a whole are moveable along said guideway.

3. The material handling device according to claim 2, comprising at least two parallel walls, which each carry a guiding rail which forms the guideway along which the respective columns are moveable.

4. The material handling device according to claim 3, wherein each guiding rail forms an upper edge of the associated wall.

5. The material handling device according to claim 3, wherein one of the guiding rails cooperates without play with rollers which support columns on the respective guiding rail and wherein the remaining guiding rails comprise a profile that accommodates rollers with play in horizontal and vertical direction.

6. The material handling device according to claim 5, wherein the profile that accommodates rollers with play in horizontal and vertical direction is a C-profile in which at least one of the rollers that is fastened to the respective column is rollably accommodated with play.

7. The material handling device according to claim 3, provided with at least one collector bin which is suspended from one or more columns on one of the walls and is movable together with the columns.

8. The material handling device according to claim 7, wherein the collector bin is suspended from an outer side of the material handling device.

9. The material handling device according to claim 7, wherein the collector bin can be moved vertically between a lower receiving position and an upper position in which emptying the collector bin is possible.

10. The material handling device according to claim 7, wherein the collector bin is provided with a mixing device.

11. The material handling device according to claim 10, wherein the collector bin comprises one or more sensors configured to determine an amount of feed collected in the collector bin.

12. The material handling device according to claim 11, wherein a drive of the mixing device is controlled by a control unit which activates the mixing device as soon as an amount of collected feed exceeds a minimum value.

13. The material handling device according to claim 11, wherein the sensors in the grab device comprise one or more weight sensors and wherein the material handling device is provided with means for determining a cutting depth and with a computer configured to calculate a volume of a bite of silage that has been separated by the grab device.

14. The material handling device according to claim 13, provided with a control unit which is arranged to determine, after the grab device has released the bite of silage, a specific gravity of the silage based on weight measured by the weight sensors and the calculated volume of the bite of silage, and a desired volume of a next bite of silage to be taken by the grab device.

15. The material handling device according to claim 14, wherein the control unit is set up to determine the specific gravity only of a second or further bite of silage by the grab device.

16. The material handling device according to claim 10, wherein the mixing device comprises a rotatably drivable mixing auger.

17. The material handling device according to claim 3, comprising three or more of said parallel walls, comprising two outer walls and one or more inner walls, wherein next to each inner wall a parallel auxiliary wall is provided and wherein in an intermediate space between each inner wall and the associated auxiliary wall a collector bin is provided that is movable with the columns.

18. The material handling device according to claim 17, wherein each inner wall carries a front column and a rear column, wherein the front columns support a front beam and the rear columns support a rear beam, wherein the grab device comprises a frame which is movable along the front beam and the rear beam.

19. The material handling device according to claim 18, wherein the two columns supported by one and the same wall are connected at a bottom side by a means of a coupling beam to which an auxiliary motor is provided which drives the movement of the columns along the guideway.

* * * * *